Patented Nov. 14, 1944

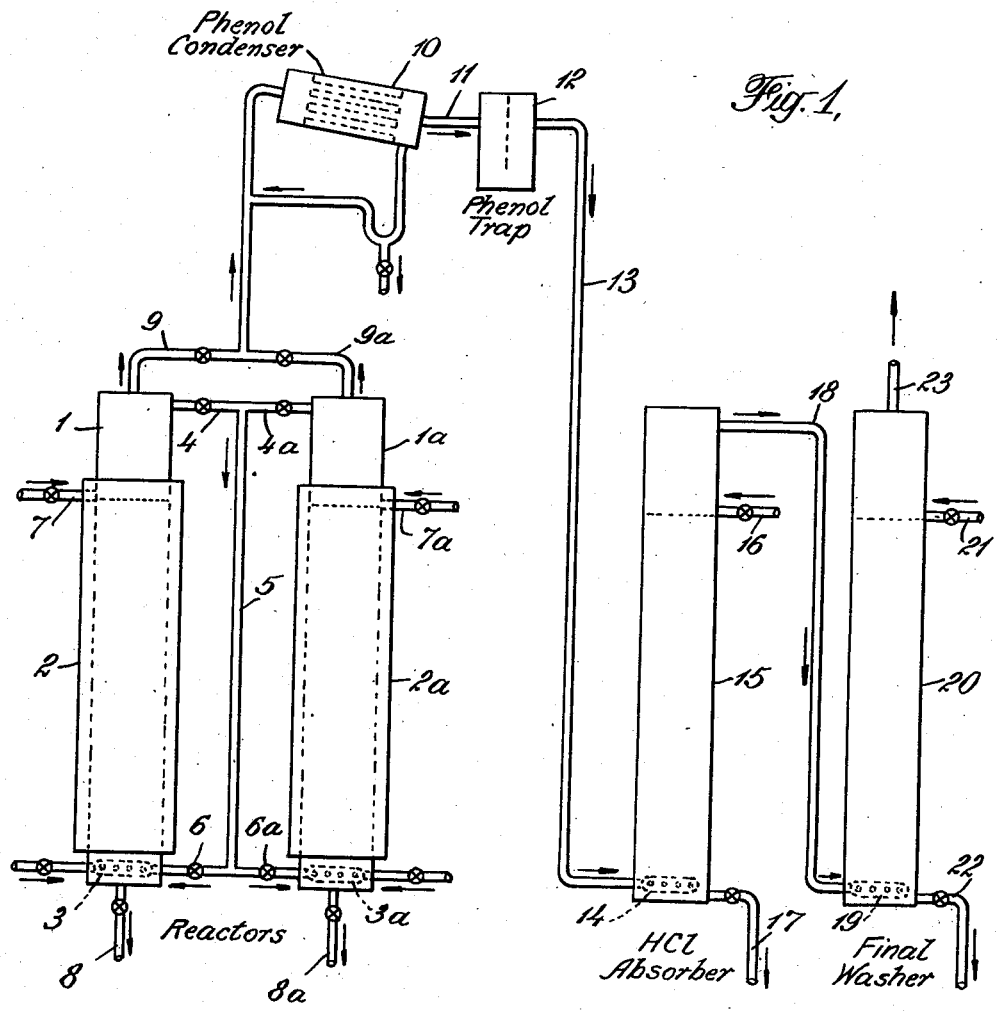

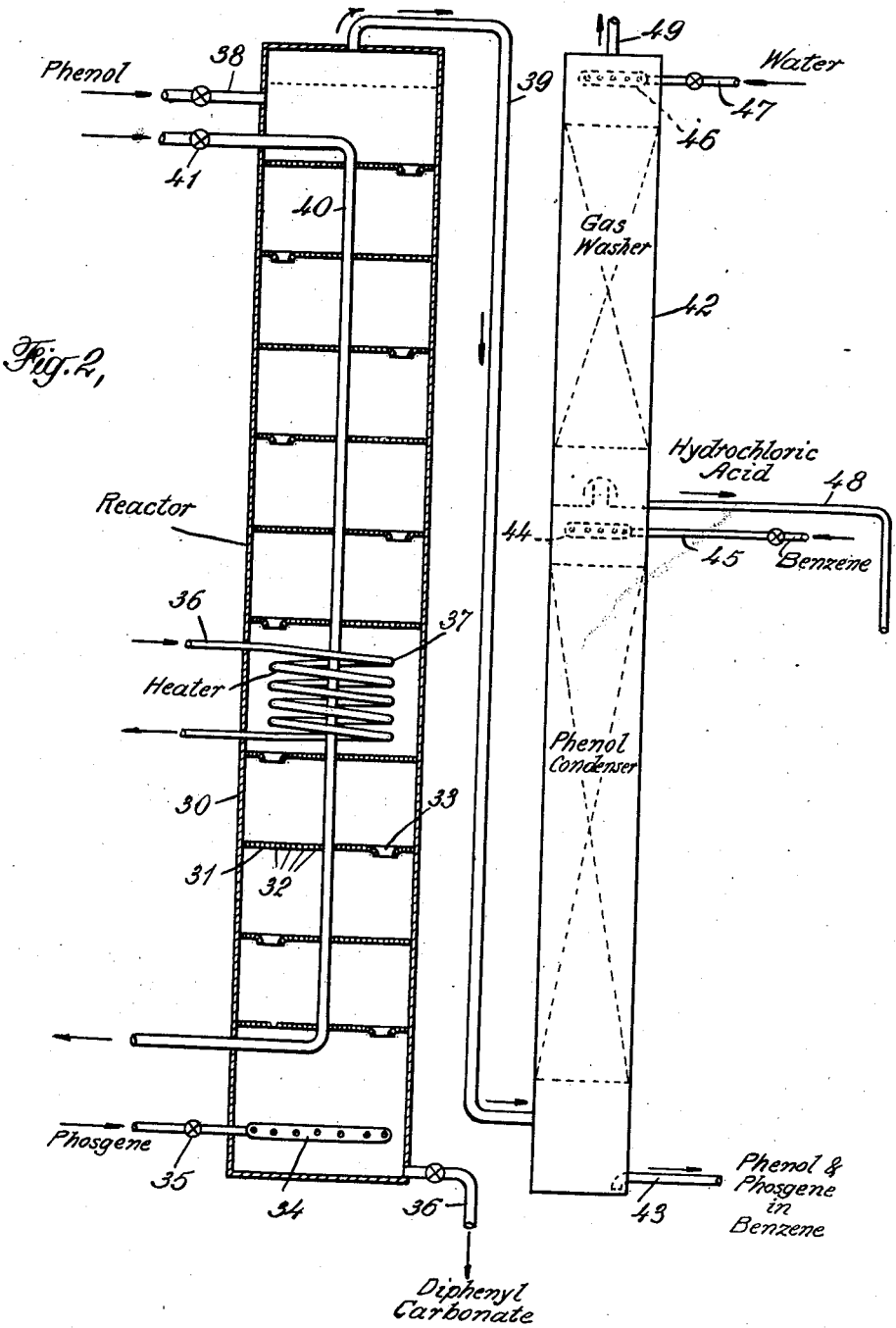

2,362,865

UNITED STATES PATENT OFFICE 2,362,865

MANUFACTURE OF AROMATIC ESTERS

Sager Tryon, Elmhurst, and William S. Benedict, New York, N. Y., assignors to General Chemical Company, New York, N. Y., a corporation of New York Application July 18, 1941, Serial No. 402,964

18 Claims. (Cl. 260—463)

This invention relates to the manufacture of aromatic esters of carbonic acid from phenols and phosgene. It is particularly concerned with the manufacture of diphenyl carbonates, dicresyl carbonates, and dinaphthyl carbonates.

Prior to the present invention the classical method for the preparation of diphenyl carbonate has involved the treatment of an aqueous solution of an alkali-metal phenate with phosgene gas, described by Hentschel. The manufacture of diphenyl carbonate by heating phenol with phosgene in a tube, described by Kempf, also has been tried but does not give as satisfactory yields as the Hentschel process. A footnote appended to Hentschel's article in the Journal fuer Praktische Chemie commented that Richter had previously led phosgene into a mixture of phenol and aluminum chloride to produce "kohlensaures phenyl" the melting point of which, according to Richter, was 88° C. Whatever the product prepared by Richter, it apparently was not diphenyl carbonate, the melting point of which is between 78.2° and 78.4° C. and not 88° C. Richter himself apparently concluded that his early work either was of no importance or did not concern diphenyl carbonate for in his "Treatise on Organic Chemistry" (11th German edition, translated to the English by D'Albe) he makes no reference to this early work and in his discussion of diphenyl carbonate cites only the Kempf and Hentschel methods of preparation.

In accordance with the present invention it has been found that excellent yields of a diaryl carbonate may be obtained by subjecting a phenol, or mixture of phenols, corresponding to the desired ester to intimate contact with the phosgene in the presence of not more than 0.2 equivalent weight of an amphoteric metal, for each phenoxy radical weight present, including that present as phenols, phenates, and phenyl carbonates. Examples of amphoteric metals which catalyze the desired reaction are aluminum, titanium, iron, zinc, and tin.

The metal may be added in the form of free metal or a soluble salt such as the halide or phenate. If the free metal or a halide is employed the metal or salt under the conditions of treatment is for the most part converted to the phenate or a mixture or phenates of the phenol or phenols present. It is probable that an equilibrium mixture of the metal chloride, the phenol, and the phenate is formed.

The process has the advantages over the Kempf and Hentschel processes in that it is capable of substantially higher yields than either process and as compared with the Hentschel process reduces handling and eliminates the necessity for converting phenol to alkali-metal phenate, thus avoiding consumption of caustic soda.

In its preferred aspects the invention involves passing phosgene into contact with a phenol containing between 0.006 and 0.04 equivalent weight of aluminum or titanium for each phenoxy radical weight present (including that present as phenols, phenates, and phenyl carbonates) while the phenol is maintained at a temperature between 150° and 250° C. By this process from 90% to 98% of the phenol may be converted to the corresponding di-aryl carbonate with a yield, based on phosgene, of about 80% to 90% or better.

The process of the invention may be conducted with various dilutions of phosgene. Thus substantially 100% phosgene may be employed or mixtures containing as low as 10% to 20% of phosgene and the balance preferably nitrogen may be used. The process may be conducted continuously or batch-wise. Contact of the phosgene with the phenol may be effected by bubbling the phosgene through the compound in liquid phase (either molten or dissolved in an inert solvent). Instead of bubbling the phosgene through the phenol, the phenol may be passed into contact with the phosgene in the form of a film or spray.

A particularly desirable method of conducting the reaction involves bringing phosgene-containing gas into contact with phenol or preferably a mixture of phenol and diphenyl carbonate containing the requisite proportion of promoting agent at a temperature above the boiling point of phenol at the pressure prevailing thereon, for example at a temperature above 180° but below 250° C. at atmospheric pressure, whereby the phosgene may be absorbed at a rapid rate in the mixture even with relatively low concentrations of phenol, to form a product of high diphenyl carbonate content. The gaseous product of this treatment, comprising unreacted phosgene, vapors of phenol, hydrogen chloride, and inert gas, is then passed into intimate contact with a phenol diphenyl carbonate mixture containing a suitable proportion of promoting agent at a substantially lower temperature, for example at a temperature between 150° C. and 180° C. for atmospheric pressure operations, whereby the gaseous mixture is cooled, residual phosgene is absorbed, and phenol vapors are condensed or absorbed. The two steps of the process may be conducted in separate vessels or in the same vessel. Thus a contact column wherein the phosgene is bubbled up through a body of phenol and diphenyl carbonate may be used—a high temperature being maintained at the bottom of the column and a relatively lower temperature near the top—to accomplish the desired purpose.

As illustrative of the phenyl carbonates which may be prepared in accordance with the present invention, the following are mentioned:

Diphenyl carbonate, from phenol,
Di-o-cresyl carbonate, from o-cresol,
Di-m-cresyl carbonate, from m-cresol,
Di-p-cresyl carbonate, from p-cresol,
Phenyl cresyl carbonates, from mixtures of phenols and the respective cresols,
o-Cresyl p-cresyl carbonate, from a mixture of o- and p-cresols,
m-Cresyl p-cresyl carbonate, from a mixture of m- and p-cresols,
o-Cresyl m-cresyl carbonate, from a mixture of o- and m-cresols,
Di-alpha-naphthyl carbonate, from alpha-naphthol,
Di-beta-naphthyl carbonate, from beta-naphthol,
Phenyl naphthyl and cresyl naphthyl carbonates, from the corresponding phenol or cresol naphthol mixtures.

The process may be conducted at ordinary atmospheric pressure or at elevated pressures. In the case of the unsymmetrical esters the desired product may be associated with varying proportions of symmetrical esters of each of the phenols present. The desired products may be separated by fractional distillation or by fractional crystallization.

The practical application of the invention to the production of diphenyl carbonate is further illustrated below with reference to the accompanying drawings wherein Fig. 1 shows apparatus especially suitable for batch operations; and Fig. 2 shows apparatus adapted for continuous operations.

With particular reference to Fig. 1 of the drawings, the numerals 1 and 1a designate twin reactor or absorber units. Each of these reactor units is a vertically elongated, tower-like vessel adapted to contain a batch of phenol. Reactors 1 and 1a are provided with heating jackets 2 and 2a for maintaining the phenol at suitable reaction temperature, suitable valve-controlled gas distributors 3 and 3a for introducing phosgene into the respective reactors, and valve-controlled outlet conduits 4 and 4a for withdrawing gas from the reactors. Conduits 4 and 4a are united to a common conduit 5 which is connected with gas distributors 3 and 3a by valve-controlled branches 6 and 6a, respectively. Reactors 1 and 1a have liquid inlet pipes 7 and 7a for introducing phenol and catalyst, and liquid outlet pipes 8 and 8a for withdrawing liquid reaction product. The reactors 1 and 1a may be constructed of glass, copper, or other suitable material.

From reactors 1 and 1a gas exhaust conduits 9 and 9a, each provided with its shut-off valve, lead to cooler 10 which may be a simple heat exchanger or waste heat boiler. Cooler 10 is connected by conduit 11 with a phenol trap 12 and phenol trap 12 is connected by conduit 13 with a gas distributor 14 located at the bottom of an absorption vessel 15. Vessel 15 may be generally similar to reactors 1 and 1a but need not be equipped with heating means since the vessel is provided for absorption of hydrogen chloride, which may be effected at ordinary temperature. Vessel 15 is provided with a valve-controlled water inlet pipe 16 and a valve-controlled hydrochloric acid outlet pipe 17. From the top of vessel 15 gas conduit 18 leads to distributor 19 located in the bottom of a second absorption unit 20 similar to unit 15. Unit 20, which is provided for removing any last traces of phosgene gas and hydrogen chloride from the exit gases before exhausting them to the atmosphere, has a valve-controlled inlet pipe 21 at the top for an alkaline wash liquor such as caustic soda solution or lime solution or slurry and a valve-controlled outlet pipe 22 at the bottom for spent wash liquor. Gas outlet conduit 23 at the top may lead to a suitable stack.

It is desirable for accurate temperature control that reactors 1 and 1a and interconnecting conduits and pipes, if any, be insulated against heat loss. Reaction temperature control may be automatic or manual.

In the operation of the above apparatus for manufacture of diphenyl carbonate from phenol, molten phenol, to which has been added about 1% by weight of anhydrous aluminum chloride, $\frac{1}{3}$% of metallic aluminum, or $2\frac{1}{3}$% of aluminum phenate is introduced by means of inlet pipes 7 and 7a into reactors 1 and 1a until each reactor is charged to about the level indicated in the drawings. Reactors 1 and 1a are operated alternately as unit #1 and unit #2, respectively. Thus, at the beginning of operations the various valves may be set to provide for flow of phosgene gas progressively through distributor 3 into unit 1, up through unit 1, through conduits 4, 5 and 6a, and distributor 3a, into reactor 1a, up through this reactor and out at 9a to cooler 10.

With heating jackets 2 and 2a operated to maintain a liquid temperature of 180° and with phenol to which has been added 1% by weight of aluminum chloride, phosgene gas may be passed into the system as outlined above at an hourly rate corresponding to 45 volumes of gas, measured at standard temperature and pressure, per volume of liquid in the two reactors. At least at the beginning, the phosgene is absorbed primarily in reactor 1, and reactor 1a serves to remove the minor proportion of the phosgene which passes out of reactor 1.

Any gas not absorbed in units 1 and 1a, and hydrogen chloride formed as a by-product of the reaction pass off to cooler 10 and the mixture is cooled in this cooler to about 30° C. or as low as practical. The cooled gas then passes to phenol trap 12 where any phenol entrained by the gases may be removed.

The substantially phenol-free hydrogen chloride gas, which may contain a small proportion of phosgene, passes into water in absorber 15 where phosgene reacts to form carbon dioxide and hydrochloric acid and hydrogen chloride is absorbed to form hydrochloric acid.

Any gas not absorbed in unit 15 and any carbon dioxide generated therein pass through conduit 18 and distributor 19 into alkaline solution in absorber 20 where traces of phosgene or hydrogen chloride may be reacted with sodium hydroxide or sodium carbonate to form salt solution. If sodium hydroxide is used, carbon dioxide in the gas will be absorbed to form sodium carbonate.

The introduction of phosgene may be continued in the above manner until the charge in unit 1 contains from 1% to 5% more or less of residual phenol. When this point is reached, gassing with phosgene is discontinued. The system may be ventilated by passing air through it for a sufficient time to exhaust its content of phosgene; molten diphenyl carbonate product may then be discharged from unit 1 through liquid discharge 8. If it is not desired to ventilate the apparatus between charges, sufficient of the diphenyl carbonate product may be retained to provide a liquid seal and avoid escape of phosgene gas.

The diphenyl carbonate product withdrawn from unit 1 may be used in its crude state for the manufacture of phenoxy benzoic acid phenyl ester as described in United States patent application Serial No. 313,922 of January 15, 1940, or it may be purified by fractional distillation of its content of unreacted phenol and volatile reaction products and by distillation, preferably in vacuo, of the diphenyl carbonate from non-volatile residue. Other conventional methods of purification, such as crystallization from a suitable solvent, may be employed. The relatively non-volatile residue may amount to 1% to 5% or so of the total product. The diphenyl carbonate yield based on phenol consumption may correspond to about 90% to 95% of the theoretical yield.

Reactor 1 is then recharged with phenol, to which has been added about 1% of aluminum chloride as catalyst, and the valve arrangement on reactors 1 and 1a is adjusted to provide for flow of phosgene first through distributor 3a, up through unit 1a, through conduits 4a, 5, and 6 to distributor 3, up through unit 1 and out through conduit 9 to cooler 10. In this way unit 1a now becomes the first reactor and unit 1 the second. Phosgene gas is then passed into distributor 3a and up through the two charges, both maintained at around 180° C., out of the cooler, and then through absorbers 15 and 20 as in the first operation. When the charge from unit 1a has been converted substantially completely to diphenyl carbonate, this charge is removed from unit 1a through product outlet pipe 8a for further processing.

During the periods when diphenyl carbonate is being withdrawn from reactors 1 and 1a in batch operations, trap 12 may be cleaned to recover any phenol brought down in this trap and cooler 10 may be heated to liquefy any phenol collected therein, and the phenol may be allowed to drain back into one or the other of reactors 1 and 1a. Hydrochloric acid may be withdrawn from absorber 15 and brine may be withdrawn from unit 20, and the two units 15 and 20 may be recharged with fresh water and alkaline solution, respectively, either intermittently or continuously.

The above system may be operated in a continuous manner by continuous introduction of phenol at 7a, withdrawal of product from reactor 1a at 8a, passage of this product, which comprises diphenyl carbonate, unreacted phenol and catalyst, into unit 1 through inlet 7, and withdrawal of final product at outlet 8. Thus a countercurrent continuous flow of reaction mixture and phosgene is provided. Cooler 10 may be operated at about 40° C. and phenol condensed therein may be returned continuously to the reactors or the cooler may be operated to condense solid phenol and the cooler and trap may be by-passed occasionally to recover phenol from cooler 10 and phenol trap 12. However, the small amount of gas passing off from the reactors carries only small quantities of phenol with it and consequently only infrequent cleaning is necessary. Hydrochloric acid and brine may be intermittently or continuously removed from absorption units 15 and 20 during continuous operations of reactors 1 and 1a and wash liquids may be added intermittently or continuously to these units to replace hydrochloric acid and brine.

The above system also may be employed either batchwise or continuously using phosgene gas diluted with inert gases. For example, instead of employing gas initially comprising approximately 100% phosgene, one may employ a gas containing from 20% to 30% of phosgene and the balance mainly nitrogen. With such a gas somewhat more phenol may escape with the vapors to cooler 10 and more frequent cleaning of this cooler and phenol trap 12 may be necessary. Using such dilute gas it is preferable to cool the spent gas mixture to a low temperature, for example to 10° C., before passing the gas into the absorber 15. A secondary cooler may be provided for this purpose and trap 12 may be omitted or not. If desired, a pair of coolers 10 may be provided for alternate operation, one being employed while phenol is being liquefied and removed from the other.

In order to provide sufficient absorption of phosgene and at the same time inhibit excessive vaporization of phenol, the second reactor may be operated at a substantially lower temperature than the first. Thus the first reactor may be operated at a temperature between 180° and 230° C., and the second reactor may be operated at about 170° C. The use of temperatures in the first reactor substantially above the boiling point of phenol is made possible by the fact that the charge in this unit comprises mainly diphenyl carbonate which boils at a relatively high temperature. Phenol vaporized in this unit is carried into the second unit operated at a temperature sufficiently low so that phenol is condensed and reacted in this unit.

It should be noted that in the above process the aluminum chloride added to the phenol charged to the reactors leaves the system mainly in the form of aluminum phenate. This may be recovered as one of the relatively non-volatile products of the diphenyl carbonate purification. The entire distillation residue may be used as catalyst for a succeeding charge of phenol; or other relatively non-volatile by-products may be extracted from the aluminum phenate by suitable organic solvents and the aluminum phenate may be added to the next charge in place of aluminum chloride; or a part of the total non-volatile residue may be added to the phenol charge and aluminum chloride may be added to make up for aluminum phenate discarded. By discarding a portion of the non-volatile impurities in this manner a building up of such impurities to an objectionable degree may be prevented. Using 2% of titanium tetrachloride as catalyst in place of aluminum and employing reaction temperatures between 170° and 180° C. with a phosgene space velocity of 33½, conversion efficiencies of 96%, based on phosgene consumed, and between 95% and 100%, based on phenol consumed, have been obtained.

In Fig. 2 of the drawings an alternative type of apparatus is illustrated adapted for continuous operation. This apparatus involves a tower 30 which may be of any suitable construction for providing intimate contact of a liquid and a gas and is shown as merely a cylindrical shell having horizontal perforated baffles 31, which are provided with small holes 32 for passage of gas and apertures 33 for passage of liquid and which are arranged to provide a more or less tortuous flow of liquid from top to bottom while providing for repeated redistribution of gas in the form of fine bubbles. Within and near the bottom of the tower there is disposed a gas distributor 34 provided with a valve-controlled inlet pipe 35. At the bottom of the tower there is also provided a valve-controlled liquid outlet pipe 36. Disposed somewhat below the center of the tower is a heating coil 37, which may contain any suitable heating fluid such as diphenyl vapor, high pressure or superheated steam, etc. At the top of the tower is a valve-controlled phenol inlet pipe 38 and a gas outlet conduit 39. More or less as a safety measure the tower may be provided with a heating pipe 40 having a valve 41. This heating pipe may serve to heat the entire length of the tower to prevent solidification of materials within the tower or to remelt such materials in the event the tower should accidentally become cooled while it is charged.

Conduit 39 leads to the bottom of a second tower 42, which is divided into two sections. Each section of tower 42 may be packed or may be merely a free space scrubber.

The lower section of tower 42 is provided with a liquid outlet pipe 43 at the bottom thereof, and a distributor 44 and supply pipe 45 at an intermediate point for spraying or otherwise introducing a suitable solvent.

Disposed with and near the top of the upper section of tower 42, which may be similar to the lower section, there is a distributor 46 having a valve-controlled wash-water inlet pipe 47. At the bottom of this section there is a wash product outlet pipe 48. From the top of tower 42 a gas conduit 49 may lead to a stack or a suitable alkali washer for removing any traces of unreacted constituents.

In the operation of this apparatus for the conversion of phenol to diphenyl carbonate by means of a gas comprising 25% phosgene and 75% nitrogen, phenol, to which has been added about 0.007 atom of aluminum metal or 0.005 mol of titanium tetrachloride per mol of phenol, is introduced at inlet 38 at a temperature of about 50° C. and at a rate regulated to maintain the tower substantially full of liquid up to the indicated liquid level. The body of phenol surrounding heating coil 37 is maintained at a temperature of around 200° to 230° C. by means of this coil. The phosgene gas is introduced through distributor 34. The gas contacts with hot reaction product comprising 90% to 98% diphenyl carbonate and is thereby heated to reaction temperature. Conversely, by this contact with the cool entering gas, the product may be cooled to a temperature around 100° C.; that is, to a relatively low temperature safely above the freezing point of the product. The product passes out through outlet 36 continuously at such a rate that it contains not more than a few percent of residual phenol.

Employing aluminum phenate in a proportion of about 0.008 mol of aluminum phenate for each mol of phenol conversions between 95% and 100% of the phenol and between 95% and 98% of the phosgene to diphenyl carbonate have been obtained.

The diphenyl carbonate product from this process may be purified in the same manner as the product of the previous examples and aluminum phenate may be recovered for reuse in a similar manner. The crude product may be used directly without any purification treatment, for the manufacture of the o-phenoxy benzoic acid phenyl ester as previously described.

The reaction of phosgene with phenol occurs mainly in that section of the apparatus in the vicinity of heater 37. The flow of hot liquid down through this heater serves to spread out the high temperature zone below the heater and the passage of gas up from the heater serves to distribute the high temperature zone in an upward direction. In the reaction zone phenol is converted to diphenyl carbonate and the phosgene gas is progressively absorbed to provide a gas of progressively lower phosgene content. Heat exchange of the hot gas with the cooler ingoing phenol serves to transfer heat from the gas to the phenol and thus cool the gas while heating the phenol toward reaction temperature.

Hydrogen chloride and nitrogen, which may be cooled in tower 30 to a temperature approaching that of the entering molten phenol, say about 60° C., are withdrawn from tower 30 and passed through conduit 39 to the lower section of tower 42 where they are scrubbed and cooled to about 30° C. by a suitable solvent for phosgene and phenol, for example, benzene. The solution of phosgene and phenol in benzene may be withdrawn through outlet 43. From the lower section the cooled product gas, from which phosgene and phenol have been removed, enters the washing tower 42 where hydrogen chloride is removed by contact of the solution with an aqueous scrubbing agent, preferably water, to provide a hydrochloric acid product. Since phosgene, phenol, and other impurities may be effectively removed in the lower section of this tower 42, a hydrochloric acid possessing a high degree of purity may be recovered directly from the upper scrubbing section provided this section is constructed of materials which are not attacked by hydrochloric acid and a water of good purity is used as absorbent.

The following examples illustrate the results that have been secured by the process of the present invention.

Example 1

39° C. melting point phenol, to which had been added 1% by weight of aluminum chloride (about 0.02 equivalent weight of aluminum per phenoxy radical weight), was gassed with 100% phosgene at a temperature varying between the limits 170° and 192° C. for 1½ hours at a rate of about ⅓ mol of phosgene per mol of phenol per hour, corresponding to a space velocity of 82. The product of this treatment comprised a crude diphenyl carbonate containing 91.2% diphenyl carbonate and had a setting point of 72° C. Upon distillation a distilled diphenyl carbonate of 78° C. melting point was obtained. The yield of diphenyl carbonate based on phenol consumed was more than 98% of theoretical and based on phosgene consumed about 79% of theoretical.

Example 2

Ortho-cresol distilling at 190° to 191° C., to which had been added 1% by weight of aluminum chloride, was gassed with 100% phosgene at a temperature varying between the limits 168° and 195° C. for 1.8 hours at a rate of about ⅓ mol of phosgene per mol of cresol per hour, corresponding to a space velocity of 72. The product of this treatment comprised a crude dicresyl carbonate containing 90.3% dicresyl carbonate and had a setting point of 49° C. Upon distillation a distilled di-o-cresyl carbonate of 56° C. melting point was obtained. The yield of dicresyl carbonate based on o-cresol consumed was about 95% of theoretical and based on phosgene consumed about 77% of theoretical.

Example 3

Meta-cresol distilling at 202° to 203° C., to which had been added 1% by weight of aluminum chloride, was gassed with 100% phosgene at a temperature varying between the limits 155° and 196° C. for 1⅔ hours at a rate of about ⅓ mol of phosgene per mol of cresol per hour, corresponding to a space velocity of 74. The product of this treatment comprised a crude dicresyl carbonate containing 90.6% di-m-cresyl carbonate and had a setting point of 45° C. Upon distillation a distilled di-m-cresyl carbonate of about 47.6° C. melting point was obtained. The yield of dicresyl carbonate based on m-cresol consumed was about 92% of theoretical and based on phosgene consumed about 80% of theoretical.

Example 4

Para-cresol distilling at 202° to 203° C., to which had been added 1% by weight of aluminum chloride, was gassed wih 100% phosgene at a temperature varying between the limits 167° and 195° C. for 1¾ hours at a rate of about ⅓ mol of phosgene per mol of cresol per hour, corresponding to a space velocity of 71. The product of this treatment comprised crude dicresyl carbonate containing 94.5% di-p-cresyl carbonate and had a setting point of 109° C. Upon distillation a distilled di-p-cresyl carbonate of 111.0° C. melting point was obtained. The yield of dicresyl carbonate based on p-cresol consumed was more than 96% of theoretical and based on phosgene consumed about 83% of theoretical.

Example 5

Beta-naphthol was dissolved in 1⅕ times its weight of nitrobenzene at 80° C. and 2% by weight of aluminum chloride (based on beta-naphthol) was added. The mixture was heated to 180° to 190° C. and gassed with 100% phosgene at a space velocity of 37. The di-2-naphthyl carbonate product was recrystallized from toluene and washed with ether. The yield of di-2-naphthyl carbonate based on naphthol consumed was about 65% of theoretical and based on phosgene consumed about 74% of theoretical.

It is to be understood the amphoteric metal stated to be present in the reaction mixture is usually present in the form of a compound thereof, e. g., the phenate and/or the chloride. However, to simplify the description and to provide a common basis for expressing the amounts of amphoteric metal compound contained in the reaction mass regardless of the particular metal present or the form in which it occurs, the amount of amphoteric metal compound present in the reaction mixture has been expressed throughout the specification and claims in terms of the free metal, except in those instances in which it is stated the reaction mixture contains a definite amount of a specified amphoteric metal compound. Accordingly, reference in the accompanying claims to the reaction mixture as containing a specified amount of amphoteric metal does not necessarily mean that the metal is present in the reaction mixture in free metallic form.

We claim:

1. The process for the manufacture of a di-aryl carbonate, which comprises reacting phosgene with at least one phenol containing as a promoting agent an amphoteric metal phenate in an amount corresponding to not more than 0.2 equivalent weight of the metal per phenoxy radical weight present.

2. The process for the manufacture of a di-aryl carbonate, which comprises contacting gaseous phosgene with at least one phenol in liquid phase at a temperature between 150° C. and 250° C. containing as a promoting agent an amphoteric metal phenate in an amount corresponding to not more than 0.2 equivalent weight of amphoteric metal per phenoxy radical weight present.

3. The process for the manufacture of a di-aryl carbonate, which comprises reacting phosgene with at least one phenol containing as a promoting agent aluminum phenate in an amount corresponding to not more than 0.2 equivalent weight of aluminum per phenoxy radical weight present.

4. The process for the manufacture of a di-aryl carbonate, which comprises reacting phosgene with at least one phenol containing as a promoting agent titanium phenate in an amount corresponding to not more than 0.2 equivalent weight of titanium per phenoxy radical weight present.

5. The process for the manufacture of a di-aryl carbonate, which comprises contacting gaseous phosgene with a phenol in liquid phase at a temperature between 150° C. and 250° C. containing as a promoting agent aluminum phenate in an amount corresponding to between 0.006 and 0.04 equivalent weight of aluminum per phenoxy radical weight present.

6. The process for the manufacture of a di-aryl carbonate, which comprises contacting gaseous phosgene with a phenol in liquid phase at a temperature between 150° C. and 250° C. containing as a promoting agent titanium phenate in an amount corresponding to between 0.006 and 0.04 equivalent weight of titanium per phenoxy radical weight present.

7. The process for the manufacture of diphenyl carbonate, which comprises intimately contacting gaseous phosgene with phenol at a temperature between 150° C. and 250° C. containing as a promoting agent an amphoteric metal phenate in an amount corresponding to not more than 0.2 equivalent weight of amphoteric metal per phenoxy radical weight present.

8. The process for the manufacture of diphenyl carbonate, which comprises intimately contacting gaseous phosgene with phenol in liquid phase at a temperature between 150° C. and 250° C. containing as a promoting agent aluminum phenate in an amount corresponding to not more than 0.2 equivalent weight of aluminum per phenoxy radical weight present.

9. The process for the manufacture of diphenyl carbonate, which comprises intimately contacting gaseous phosgene with phenol in liquid phase at a temperature between 150° C. and 250° C. and containing as a promoting agent titanium phenate in an amount corresponding to not more than 0.2 equivalent weight of titanium per phenoxy radical weight present.

10. In the process for the manufacture of a di-aryl carbonate by reacting a phenol and phosgene, the improvement which comprises bringing the phosgene gas into contact with a molten mixture of the di-aryl carbonate and the corresponding phenol containing as a promoting agent an amphoteric metal phenate in an amount corresponding to between 0.006 and 0.04 equivalent weight of amphoteric metal per phenoxy radical weight present.

11. In the process for the manufacture of diphenyl carbonate, which comprises reacting phenol with phosgene, the improvement which comprises bringing phosgene gas into contact with a reaction mixture of phenol and diphenyl carbonate maintained at a temperature above the boiling point of phenol at the prevailing pressure and below the boiling point of diphenyl carbonate at said pressure, and passing the resulting gas into contact with additional phenol diphenyl carbonate mixture maintained at a temperature below the boiling point of phenol at the pressure prevailing thereon so as to remove phenol from said gas.

12. In the process for the manufacture of diphenyl carbonate by reacting phenol and phosgene, the improvement which comprises bringing phosgene gas into contact with a reaction mixture of phenol and diphenyl carbonate containing aluminum phenate corresponding to between 0.006 and 0.04 equivalent weight of aluminum per phenoxy radical weight present, maintained at a temperature above the boiling point of phenol at the prevailing pressure and below the boiling point of diphenyl carbonate at said pressure, and passing the resulting gas into contact with additional phenol diphenyl carbonate mixture containing aluminum phenate corresponding to between 0.006 and 0.04 equivalent weight of aluminum per phenoxy radical weight present, maintained at a temperature below the boiling point of phenol at the pressure prevailing thereon so as to remove phenol from said gas.

13. In the process for the manufacture of diphenyl carbonate by reacting phenol and phosgene, the improvement which comprises bringing phosgene gas into contact with a reaction mixture of phenol and diphenyl carbonate containing titanium phenate corresponding to between 0.006 and 0.04 equivalent weight of titanium per phenoxy radical weight present, maintained at a temperature above the boiling point of phenol at the prevailing pressure and below the boiling point of diphenyl carbonate at said pressure, and passing the resulting gas into contact with additional phenol diphenyl carbonate mixture containing titanium phenate corresponding to between 0.006 and 0.04 equivalent weight of titanium per phenoxy radical weight present, maintained at a temperature below the boiling point of phenol at the pressure prevailing thereon so as to remove phenol from said gas.

14. The process for the manufacture of diphenyl carbonate by reacting phenol and phosgene, which comprises bringing phosgene gas into intimate contact with a reaction mixture of phenol and diphenyl carbonate containing aluminum phenate corresponding to between 0.006 and 0.04 equivalent weight of aluminum per phenoxy radical weight present, maintained at about atmospheric pressure and at a temperature between 180° and 250° C., and passing the resulting gas into contact with additional phenol diphenyl carbonate mixture containing aluminum phenate corresponding to between 0.006 and 0.04 equivalent weight of aluminum per phenoxy radical weight present, maintained at a temperature between 150° and 180° C. so as to remove phenol from said gas.

15. The process for the manufacture of diphenyl carbonate by reacting phenol and phosgene, which comprises bringing phosgene gas into intimate contact with a reaction mixture of phenol and diphenyl carbonate containing titanium phenate corresponding to between 0.006 and 0.04 equivalent weight of titanium per phenoxy radical weight present, maintained at about atmospheric pressure and at a temperature between 180° and 250° C., and passing the resulting gas into contact with additional phenol diphenyl carbonate mixture containing titanium phenate corresponding to between 0.006 and 0.04 equivalent weight of titanium per phenoxy radical weight present, maintained at a temperature between 150° and 180° C. so as to remove phenol from said gas.

16. The process for the manufacture of a diaryl carbonate, which comprises bringing phosgene into intimate contact with a solution of a phenol in an inert solvent maintained at a reaction temperature between 150° C. and 250° C. and containing as a promoting agent the phenate of an amphoteric metal with said phenol, in an amount corresponding to not more than 0.2 equivalent weight of amphoteric metal per phenoxy radical weight present.

17. The process for the manufacture of a dinaphthyl carbonate, which comprises bringing phosgene into intimate contact with a solution of a naphthol in an inert solvent maintained at a reaction temperature between 150° C. and 250° C. and containing as a promoting agent the naphtholate of an amphoteric metal with said naphthol, in an amount corresponding to not more than 0.2 equivalent weight of amphoteric metal per naphthoxy radical weight present.

18. In the process for the manufacture of a diaryl carbonate, which comprises reacting a phenol with phosgene, the improvement which comprises bringing phosgene gas into contact with a reaction mixture of a phenol and a diaryl carbonate corresponding thereto maintained at a temperature above the boiling point of the phenol at the prevailing pressure and below the boiling point of the carbonate at said pressure, and passing the resulting gas into contact with additional phenol-diaryl carbonate mixture maintained at a pressure below the boiling point of the phenol at the pressure prevailing thereon so as to remove the phenol from said gas.

SAGER TRYON.
WILLIAM S. BENEDICT.